(12) United States Patent
Keränen et al.

(10) Patent No.: US 11,172,000 B2
(45) Date of Patent: Nov. 9, 2021

(54) METHODS AND APPARATUS FOR FACILITATING REAL TIME MULTIMEDIA COMMUNICATIONS

(71) Applicant: Telefonaktiebolaget LM Ericsson (publ), Stockholm (SE)

(72) Inventors: Ari Keränen, Helsinki (FI);
Heidi-Maria Back, Helsinki (FI);
Nicklas Beijar, Kirkkonummi (FI);
Jaime Jiménez, Helsinki (FI); Mert Ocak, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/338,271

(22) PCT Filed: Oct. 21, 2016

(86) PCT No.: PCT/EP2016/075428
§ 371 (c)(1),
(2) Date: Mar. 29, 2019

(87) PCT Pub. No.: WO2018/072851
PCT Pub. Date: Apr. 26, 2018

(65) Prior Publication Data
US 2019/0238597 A1    Aug. 1, 2019

(51) Int. Cl.
*G06F 15/16*    (2006.01)
*H04L 29/06*    (2006.01)
*H04L 29/08*    (2006.01)

(52) U.S. Cl.
CPC ...... *H04L 65/1069* (2013.01); *H04L 65/1073* (2013.01); *H04L 67/2809* (2013.01); *H04L 67/02* (2013.01)

(58) Field of Classification Search
CPC ............. H04L 65/1069; H04L 65/1073; H04L 67/2809; H04L 67/02
(Continued)

(56) References Cited

U.S. PATENT DOCUMENTS 7,289,464 B2 * 10/2007 Li ....................... H04L 65/1006
370/328
7,840,681 B2 * 11/2010 Acharya ............. H04L 65/1006
709/227
(Continued)

FOREIGN PATENT DOCUMENTS

WO    2016076773 A1    5/2016

OTHER PUBLICATIONS

Uberti, J. et al., Javascript Session Establishment Protocol: draft-ietf-rtcweb-jsep-12, Oct. 18, 2015, IEEE, pp. 1-80. (Year: 2015).*
(Continued)

*Primary Examiner* — Alicia Baturay
(74) *Attorney, Agent, or Firm* — Murphy, Bilak & Homiller, PLLC

(57) ABSTRACT

A method (100) for facilitating real time multimedia communications between a constrained device and a multimedia client is disclosed. The method comprises discovering an identity and a multimedia capability of a constrained device (110), 5 receiving, from a multimedia client, a request for multimedia content from the constrained device (120), mapping information from the request to a message format used by the constrained device (130), and forwarding the mapped information to the constrained device (140). Also disclosed is a method (300) performed by a constrained device having a multimedia capability. The method comprises registering 10 an identity of the constrained device and metadata about the multimedia capability of the constrained device with a resource directory (310).

24 Claims, 9 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 9,071,572 B2* | 6/2015 | Ukkola | .................. | H04L 67/02 |
| 9,197,676 B2* | 11/2015 | Buckley | .................. | H04L 69/04 |
| 9,917,821 B2* | 3/2018 | Gillmore | ............... | H04L 63/067 |
| 10,015,146 B2* | 7/2018 | Bhattacharyya | ...... | H04L 63/061 |
| 10,075,422 B2* | 9/2018 | Rawcliffe | ............... | H04L 67/10 |
| 10,091,329 B2* | 10/2018 | Kuo | ...................... | H04L 67/327 |
| 10,114,680 B2* | 10/2018 | Wang | ...................... | H04L 67/16 |
| 10,123,190 B2* | 11/2018 | Kaushik | ................... | H04L 43/50 |
| 10,142,819 B2* | 11/2018 | Chennakeshu | ....... | H04W 12/04 |
| 10,200,353 B2* | 2/2019 | Seed | ........................ | H04L 67/14 |
| 10,250,558 B2* | 4/2019 | Starsinic | ................ | H04W 4/02 |
| 10,250,565 B2* | 4/2019 | Dong | ...................... | H04L 63/107 |
| 10,257,136 B2* | 4/2019 | Wang | ...................... | H04L 51/06 |
| 10,367,896 B2* | 7/2019 | Seed | ...................... | H04L 69/321 |
| 10,374,803 B2* | 8/2019 | Clark | .................. | H04L 63/0876 |
| 10,419,579 B2* | 9/2019 | Keranen | ................ | H04L 67/02 |
| 10,484,869 B2* | 11/2019 | Bone | ................ | H04W 12/0431 |
| 10,523,537 B2* | 12/2019 | Turow | ................ | H04L 43/0817 |
| 10,637,825 B2* | 4/2020 | Novo Diaz | ........... | H04L 69/167 |
| 10,693,879 B2* | 6/2020 | Salmela | ................ | H04L 67/145 |
| 2014/0067902 A1* | 3/2014 | Wang | ...................... | H04W 4/70 709/201 |
| 2014/0344269 A1* | 11/2014 | Dong | ...................... | H04L 67/12 707/736 |
| 2016/0088049 A1* | 3/2016 | Seed | ...................... | H04L 67/18 709/203 |
| 2017/0187831 A1* | 6/2017 | Otting | ................ | H04L 41/0886 |
| 2017/0237742 A1* | 8/2017 | Salmela | ............. | H04L 63/0823 726/4 |
| 2017/0302745 A1* | 10/2017 | Jimenez | ................ | H04L 61/103 |
| 2017/0325125 A1* | 11/2017 | Novo Diaz | ............. | H04L 69/04 |
| 2018/0254976 A1* | 9/2018 | Kauppinen | ............... | H04L 1/16 |
| 2019/0058769 A1* | 2/2019 | Keranen | ................ | H04L 67/16 |
| 2019/0223010 A1* | 7/2019 | Keranen | ............ | H04W 88/023 |
| 2019/0230167 A1* | 7/2019 | Laari | .................. | H04L 61/1511 |
| 2019/0238597 A1* | 8/2019 | Keranen | ............ | H04L 65/1069 |
| 2019/0319917 A1* | 10/2019 | Jimenez | ................ | G06F 16/00 |
| 2020/0412862 A1* | 12/2020 | Oh | ........................ | H04W 76/14 |

OTHER PUBLICATIONS

Shelby, Z, et al., "CoRE Resource Directory draft-shelby-core-resource-directory-05", CoRE; Internet—Draft; Intended status: Standards Track, Feb. 25, 2013, pp. 1-27.

Uberti, J, et al., "Javascript Session Establishment Protocol draft-ietf-rtcweb-jsep-12", Network Working Group, Internet—Draft, Intended status: Standards Track, Oct. 18, 2015, pp. 1-80.

Cirani, Simone, et al., "CoSIP: a Constrained Session Initiation Protocol for the Internet of Things", 2013, 1-15.

Groves, C., et al., "A WebRTC Data Channel Transport for the Constrained Application Protocol (CoAP) draft-groves-coap-webrtcdc-01", CoRE Working Group Internet—Draft, Huawei, Oct. 17, 2016, 1-23.

Borman, C., et al., "Terminology for Constrained-Node Networks", Internet Engineering Task Force (IETF), Request for Comments: 7228, Universitaet Bremen TZI, May 2014, pp. 1-17.

Hartke, K., "Observing Resources in the Constrained Application Protocol (CoAP)", Internet Engineering Task Force (IETF), Request for Comments: 7641, Universitaet Bremen TZI, Sep. 2015, pp. 1-30.

Shelby, Z., et al., "The Constrained Application Protocol (CoAP)", Internet Engineering Task Force (IETF), Request for Comments: 7252, Universitaet Bremen TZI, Jun. 2014, pp. 1-112.

* cited by examiner

METHODS AND APPARATUS FOR
FACILITATING REAL TIME MULTIMEDIA
COMMUNICATIONS

TECHNICAL FIELD

The present disclosure relates to a method for facilitating real time multimedia communications between a constrained device and a multimedia client and to a method performed by a constrained device having a multimedia capability. The present disclosure also relates to a system for facilitating real time multimedia communications between a constrained device and a multimedia client, and to a proxy, a constrained device and to a computer program and a computer program product configured, when run on a computer to carry out methods performed in a proxy and in a constrained device.

BACKGROUND

The "Internet of Things" (IoT) refers to devices enabled for communication network connectivity, so that these devices may be remotely managed, and data collected or required by the devices may be exchanged between individual devices and between devices and application servers. Such devices are often subject to severe limitations on processing power, storage capacity, energy supply, device complexity and/or network connectivity, imposed by their operating environment or situation, and may consequently be referred to as constrained devices. The Constrained Application Protocol (CoAP), as defined in RFC7252, is commonly used as the application layer protocol for IoT when communicating with or between constrained IoT devices. CoAP provides a request-response based RESTful communication architecture between constrained devices or between constrained devices and Internet nodes. CoAP can be integrated with HTTP-based web services by translating CoAP messages to HTTP.

Constrained devices are often associated with sensors used for monitoring environmental conditions or the physical condition of a patient or subject. As such, it is assumed that constrained devices are usually required to transfer very simple information to and from an application server, the information principally comprising sensor measurements, or an indication of a change with respect to a previous measurement. This information may efficiently be transferred between a device and an application server, for example via a gateway or border router, using CoAP messages. Scenarios may be envisaged however in which a constrained device on a constrained network may be controlling a more powerful device, including multimedia devices such as a microphone or video camera. In such situations, it will be desirable for the constrained device to be able to transfer the multimedia data stream generated by the multimedia device to an application server or other node connected to the Internet. The current version of the CoAP protocol is unable to control the transfer of such data streams by constrained devices.

SUMMARY

It is an aim of the present disclosure to provide a method and apparatus which facilitate real time multimedia communication between a constrained device and a multimedia client.

According to a first aspect of the present disclosure, there is provided a method for facilitating real time multimedia communications between a constrained device and a multimedia client. The method comprises discovering an identity and a multimedia capability of a constrained device, receiving, from a multimedia client, a request for multimedia content from the constrained device, mapping information from the request to a message format used by the constrained device, and forwarding the mapped information to the constrained device.

According to examples of the present disclosure, a multimedia capability may comprise at least one of an identification of a multimedia resource controlled by the constrained device and/or parameters relating to multimedia content provided by the multimedia resource. According to examples of the present disclosure, a multimedia resource may be an audio and/or video resource and a constrained device identity may comprise any suitable character string, including for example a SIP URI, a FQDN etc. A constrained device identity may comprise an identity of the constrained device itself and/or an identity of multimedia resources controlled by the constrained device.

For the purposes of the present disclosure, a constrained device comprises a device which conforms to the definition set out in section 2.1 of RFC 7228 for "constrained node". According to the definition in RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content while goods are transported and stored, motion sensors for controlling light bulbs, sensors measuring light that can be used to control shutters, heart rate monitor and other sensors for personal health (continuous monitoring of blood pressure etc.) and connected electronic door locks.

For the purposes of the present disclosure, a constrained network comprises a network in which at least some of the network devices are constrained devices as defined above.

According to examples of the present disclosure, the method may further comprise receiving, from the constrained device, an acknowledgement of the mapped information, mapping information from the acknowledgement to a message format used by the multimedia client, and transmitting to the multimedia client the mapped information from the acknowledgement and a discovered multimedia capability of the constrained device.

According to examples of the present disclosure, the method may be performed by a proxy, and the discovered multimedia capability of the constrained device that is transmitted to the multimedia client may comprise parameters relating to multimedia content provided by the multimedia resource, which parameters may be required by the multimedia client to establish multimedia communication with the constrained device.

According to examples of the present disclosure, the real time multimedia communications may conform to the WebRTC standard.

According to examples of the present disclosure, the message format used by the constrained device may be a Constrained Application Protocol (CoAP) message format.

According to examples of the present disclosure, mapping information from the request to a message format used by the constrained device may comprise mapping information from the request to a CoAP POST request. Forwarding the mapped information to the constrained device may comprise forwarding the mapped information in a JSON format.

According to examples of the present disclosure, the message format used by the multimedia client may be a JavaScript Session Establishment Protocol (JSEP) message format.

According to examples of the present disclosure, receiving a request for multimedia content from the multimedia client may comprise receiving a JSEP WebRTC offer.

According to examples of the present disclosure, the information mapped from the request to a message format used by the constrained device may comprise at least an indication of a multimedia resource specified in the request, and transport layer information for a destination to which the specified resource should be transmitted.

According to examples of the present disclosure, the transport layer information may comprise an IP address and a transport layer (e.g., Transmission Control Protocol (TCP) or User Datagram Protocol (UDP)) port for the destination to which transmission of the specified resource should be initiated.

According to examples of the present disclosure, the information mapped from the request to a message format used by the constrained device may further comprise key material for securing communications between the constrained device and the multimedia client. The information mapped from the acknowledgment to a message format used by the multimedia client may comprise corresponding key material for the constrained device.

According to examples of the present disclosure, mapping information from the request to a message format used by the constrained device may comprise omitting from the mapping any information relating to attributes or parameters not supported by the constrained device.

According to examples of the present disclosure, discovering an identity and a multimedia capability of a constrained device may comprise obtaining an identity of the constrained device, checking for availability of metadata about multimedia resources controlled by the constrained device, and storing any available metadata with the identity of the device.

According to examples of the present disclosure, the metadata may be in a Session Description Protocol (SDP) compatible format.

According to examples of the present disclosure, discovering an identity and a multimedia capability of a constrained device may further comprise comparing available metadata about multimedia resources controlled by the constrained device to multimedia resource parameters required by the multimedia client to establish multimedia communication with the constrained device, and, if the available metadata about multimedia resources controlled by the constrained device is insufficient to provide the multimedia resource parameters required by the multimedia client, establishing the remaining multimedia resource parameters required by the multimedia client via a test session with the constrained device.

According to examples of the present disclosure, establishing the remaining multimedia resource parameters required by the multimedia client via a test session with the constrained device may comprise initiating a test session with the constrained device, obtaining the remaining multimedia resource parameters required by the multimedia client during the test session, and storing the obtained multimedia parameters with the identity of the constrained device.

According to examples of the present disclosure, initiating a test session with the constrained device may comprise requesting multimedia content from the constrained device and obtaining the remaining multimedia resource parameters required by the multimedia client during the test session may comprise seeking to decode the requested multimedia content using different multimedia parameters and determining which parameters enable successful decoding of the requested content.

According to examples of the present disclosure, the multimedia parameters may comprise different multimedia codecs which may be supported by the constrained device.

According to examples of the present disclosure, obtaining an identity of the constrained device and checking for availability of metadata about multimedia resources controlled by the constrained device may comprise querying a resource directory for identities and multimedia resource metadata of multimedia capable constrained devices.

According to examples of the present disclosure, the resource directory may comprise a resource directory as defined in the "CoRE Resource Directory" specification.

According to examples of the present disclosure, querying a resource directory for identities and multimedia resource metadata of multimedia capable constrained devices may comprise registering as an observer for multimedia capable constrained devices registered with the resource directory.

According to examples of the present disclosure, registering as an observer may comprise sending an extended get request according to the Observe protocol extension to CoAP, RFC 7641.

According to examples of the present disclosure, transmitting to the multimedia client the mapped information from the acknowledgement and a discovered multimedia capability of the constrained device may comprise retrieving stored metadata and/or obtained multimedia parameters and adding the retrieved metadata and/or multimedia parameters to the mapped information from the acknowledgement for transmission to the multimedia client.

According to examples of the present disclosure, at least one of the constrained device and the multimedia client may be located behind a Network Address Translation (NAT), gateway, and the transport layer information for a destination to which the specified resource should be transmitted may comprise client side parameters for a NAT traversal mechanism.

According to examples of the present disclosure, the acknowledgment received from the constrained device may comprise device side parameters for the NAT traversal mechanism and the information mapped from the acknowledgement to a message format used by the multimedia client may comprise device side NAT traversal mechanism parameters.

According to examples of the present disclosure, the NAT traversal mechanism may comprise Interactive Connectivity Establishment (ICE) and the NAT traversal mechanism parameters may comprise ICE candidates.

According to examples of the present disclosure, the constrained device may not include NAT traversal mechanism capabilities. In such examples, NAT traversal mechanism parameters may be exchanged via the proxy between the multimedia client and a border router, which may perform NAT traversal actions on behalf of the constrained device and forward to the constrained device the result of the NAT traversal mechanism, that is an address for direct multimedia communication with the multimedia client.

According to another aspect of the present disclosure, there is provided a method performed by a constrained device having a multimedia capability, the method comprising registering an identity of the constrained device and metadata about the multimedia capability of the constrained device with a resource directory.

According to examples of the present disclosure, the resource directory may comprise a resource directory as defined in the "CoRE Resource Directory" specification. A device identity may comprise any suitable character string, including for example a SIP URI, a FQDN etc. Device identity may comprise an identity of the constrained device itself and/or an identity of multimedia resources controlled by the constrained device.

According to examples of the present disclosure, the metadata about the multimedia capability of the constrained device may comprise at least one of a resource type of a multimedia resource controlled by the constrained device and/or a content type of multimedia content which may be provided by the multimedia resource.

According to examples of the present disclosure, the metadata may further comprise parameters necessary for the receipt and decoding of multimedia content which may be provided by the multimedia resource.

According to examples of the present disclosure, the parameters may include codecs, codec parameters, supported Real Time Control Protocol (RTCP) features etc.

According to another aspect of the present disclosure, there is provided a computer program comprising instructions which, when executed on at least one processor, cause the at least one processor to carry out a method according to any one of the preceding claims.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a proxy for facilitating real time multimedia communications between a constrained device and a multimedia client. The proxy comprises a processor and a memory, the memory containing instructions executable by the processor such that the proxy is operative to discover an identity and a multimedia capability of a constrained device, receive, from a multimedia client, a request for multimedia content from the constrained device, map information from the request to a message format used by the constrained device, and forward the mapped information to the constrained device.

According to examples of the present disclosure, the proxy may be further operative to carry out a method according to a preceding aspect or example of the present disclosure.

According to another aspect of the present disclosure, there is provided a proxy for facilitating real time multimedia communications between a constrained device and a multimedia client. The proxy is adapted to discover an identity and a multimedia capability of a constrained device, receive, from a multimedia client, a request for multimedia content from the constrained device, map information from the request to a message format used by the constrained device, and forward the mapped information to the constrained device.

According to examples of the present disclosure, the proxy may be adapted to carry out a method according to a preceding aspect or example of the present invention.

According to another aspect of the present disclosure, there is provided a proxy for facilitating real time multimedia communications between a constrained device and a multimedia client. The proxy comprises a discovery module for discovering an identity and a multimedia capability of a constrained device, a receiving module for receiving, from a multimedia client, a request for multimedia content from the constrained device, a mapping module for mapping information from the request to a message format used by the constrained device, and a transmission module for forwarding the mapped information to the constrained device.

According to another aspect of the present disclosure, there is provided a constrained device having a multimedia capability. The constrained device comprises a processor and a memory, the memory containing instructions executable by the processor such that the constrained device is operative to register an identity of the constrained device and metadata about the multimedia capability of the constrained device with a resource directory.

According to examples of the present disclosure, the constrained device may be further operative to carry out a method according to a preceding aspect or example of the present invention.

According to another aspect of the present disclosure, there is provided a constrained device having a multimedia capability, the constrained device being adapted to register an identity of the constrained device and metadata about the multimedia capability of the constrained device with a resource directory.

According to examples of the present disclosure, the constrained device may be further adapted to carry out a method according to a preceding aspect or example of the present invention.

According to another aspect of the present disclosure, there is provided a constrained device having a multimedia capability. The constrained device comprises a registering module for registering an identity of the constrained device and metadata about the multimedia capability of the constrained device with a resource directory.

According to another aspect of the present disclosure, there is provided a system for facilitating real time multimedia communications between a constrained device and a multimedia client, the system comprising a constrained device having multimedia capability, a multimedia client and a proxy. The multimedia client is configured to request multimedia content from the constrained device. The proxy is configured to discover an identity and a multimedia capability of the constrained device, receive from the multimedia client the request for multimedia content from the constrained device, map information from the request to a message format used by the constrained device, and forward the mapped information to the constrained device.

According to examples of the present disclosure, the constrained device may be configured to register an identity of the constrained device and metadata about the multimedia capability of the constrained device with a resource directory.

According to examples of the present disclosure, the constrained device may be configured to acknowledge to the proxy receipt of the forwarded mapped information, and the proxy may be configured to receive the acknowledgement from the constrained device, map information from the acknowledgement to a message format used by the multimedia client, and transmit to the multimedia client the mapped information from the acknowledgement and a discovered multimedia capability of the constrained device.

According to examples of the present disclosure, the constrained device and the multimedia client may be configured to establish real time multimedia communications on the basis of the information exchanged with and via the proxy.

According to examples of the present disclosure, the constrained device and the multimedia client may be configured to perform connectivity checks on the basis of information exchanged with and via the proxy.

According to examples of the present disclosure, the system may further comprise a border router in communication with the proxy and the constrained device, and the border router may be configured to manage a NAT traversal mechanism for establishing real time multimedia communications between the constrained device and the multimedia client.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide methods according to which real time multimedia communication between a constrained device and a multimedia client is facilitated via the mapping of information from a request for multimedia content received from a multimedia client to a message format used by a constrained device having a multimedia capability.

Web Real Time Communication (WebRTC) is an API definition for real time audio and/or video communication using standard browsers. WebRTC is governed by standards documents issued by the World Wide Web Consortium (W3C) and the Internet Engineering Task Force (IETF). The core idea of WebRTC is that the signalling required to setup a multimedia session comprising audio and/or video content can be performed using JavaScript in a standard browser without additional plugins. JavaScript Session Establishment Protocol (JSEP) is a protocol defined by the IETF for controlling the signalling of a WebRTC session.

In order to facilitate real time multimedia communication involving constrained devices, it is desirable to be able use the CoAP protocol to control WebRTC multimedia streams that are to be transferred from a constrained device to the Internet. Aspects of the present invention enable this use of the CoAP protocol by providing mapping of information from a multimedia content request, which may for example be a WebRTC request, to a message format used by a constrained device, which may be a CoAP message format.

Figure 1:
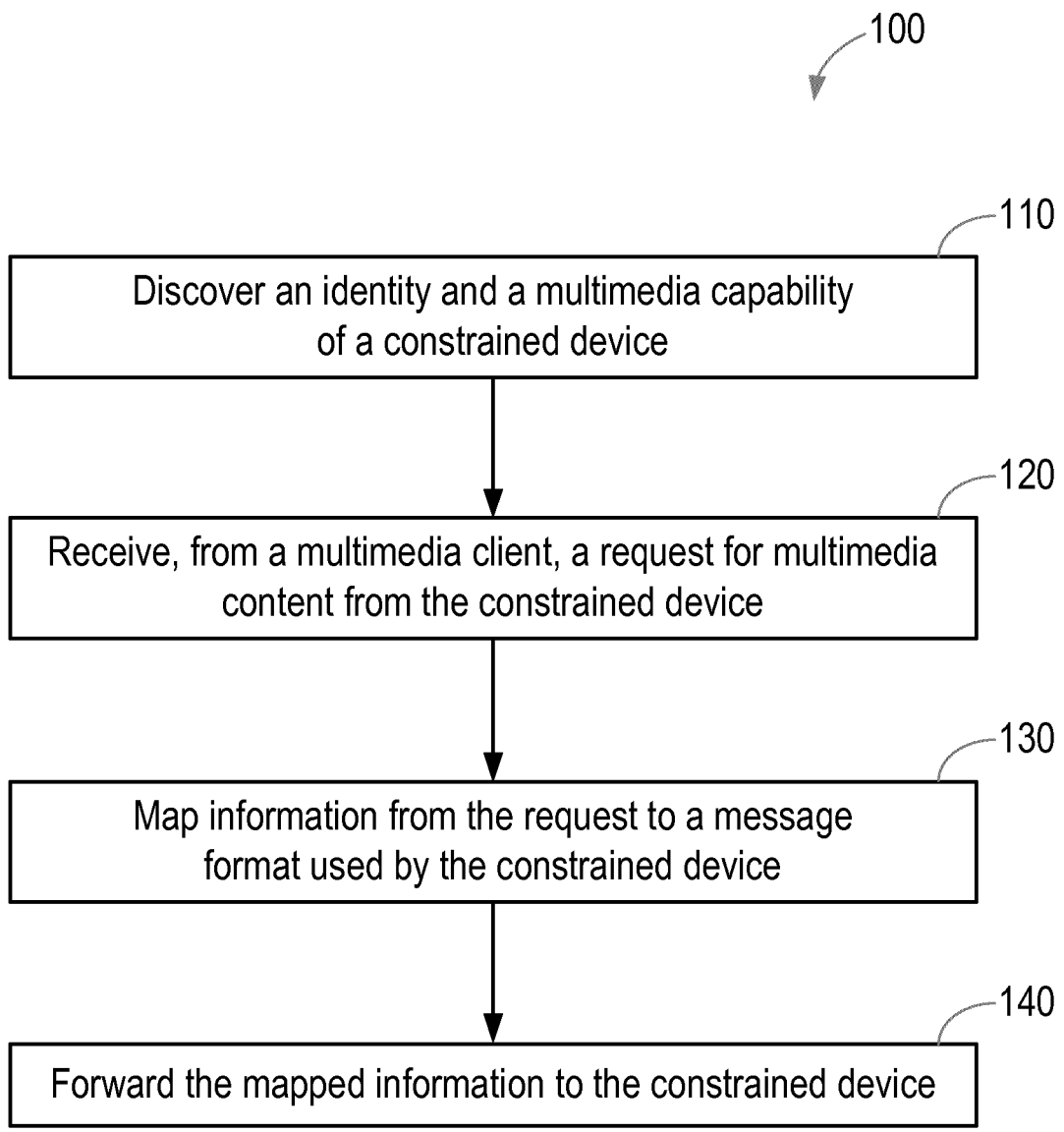
FIG. 1 is a flow chart illustrating process steps in a method for facilitating real time multimedia communications.

FIG. 1 illustrates process steps in a first example of a method 100 for facilitating real time multimedia communications between a constrained device and a multimedia client. The method 100 may in some examples be performed by a proxy.

Referring to FIG. 1, in a first step 110, the method 100 comprises discovering an identity and a multimedia capability of a constrained device. A multimedia capability may for example comprise at least one of an identification of a multimedia resource controlled by the constrained device and/or parameters relating to multimedia content provided by the multimedia resource. The multimedia resource may be audio and/or video. A constrained device identity may comprise any suitable character string, including for example a SIP URI, a FQDN etc. A constrained device identity may include an identity of the constrained device itself and/or an identity of multimedia resources controlled by the constrained device.

In a second step 120, the method 100 comprises receiving, from a multimedia client, a request for multimedia content from the constrained device. The method 100 then comprises, at step 130, mapping information from the request to a message format used by the constrained device, and, at step 140, forwarding the mapped information to the constrained device. As discussed above, in some examples, the real time multimedia communications may conform to the WebRTC standards and the message format used by the constrained device may be a CoAP message format. In some examples, the request for multimedia content may be received in a message format used by the multimedia client, which may for example be a JSEP message format.

The mapping action of the method 100 enables a request for real time multimedia content to be forwarded to a constrained device with a multimedia capability in a format that the constrained device can process, so allowing the constrained device to respond to the request and thus facilitating the establishment of real time multimedia communication between the constrained device and the multimedia client.

Figure 2A:
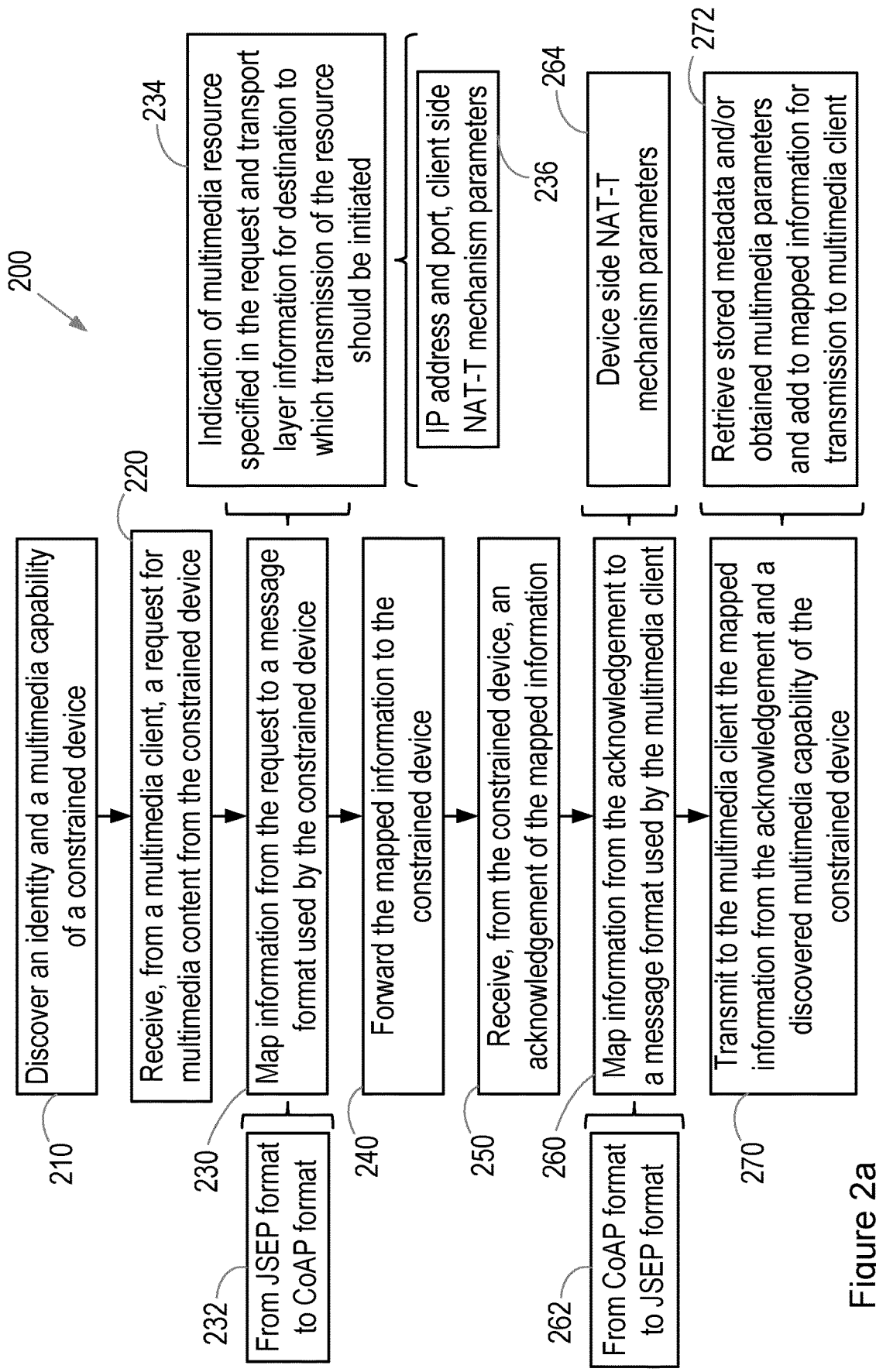
FIGS. 2a and 2b are flow charts illustrating process steps in another example of method for facilitating real time multimedia communications.
Figure 2B:
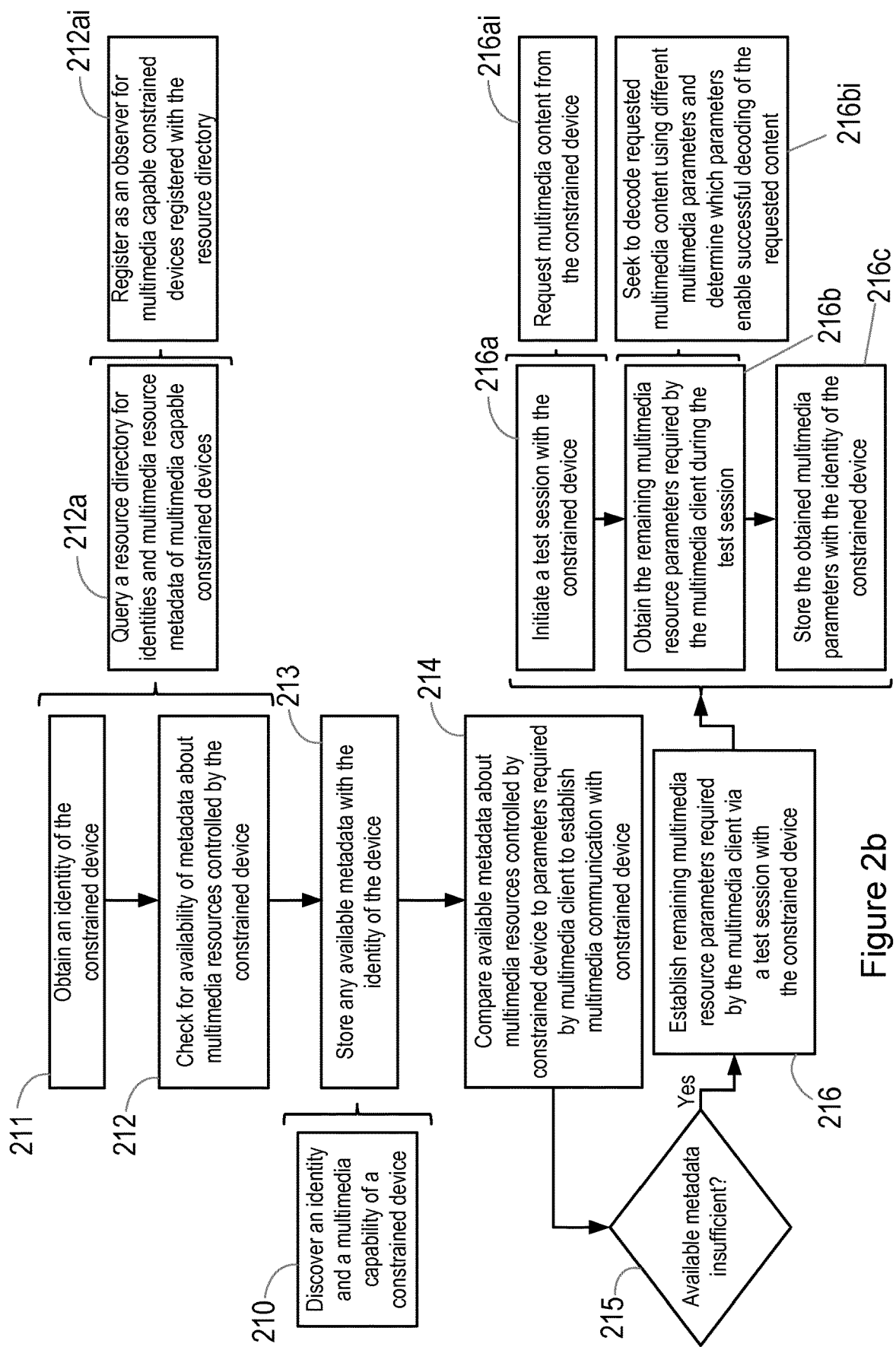

FIGS. 2a and 2b illustrate another example of method 200 for facilitating real time multimedia communication between a constrained device and a multimedia client. The method 200 illustrates one way in which the steps of the method 100 may be implemented and supplemented to achieve the above discussed and additional functionality. As for the method 100 of FIG. 1, the method 200 of FIG. 2 may be performed by a proxy.

Referring to FIG. 2, in a first step 210, the proxy discovers an identity and a multimedia capability of a constrained device. The process of discovering an identity and a multimedia capability of a constrained device is illustrated in greater detail in FIG. 2b. Referring to FIG. 2b, the proxy may perform the process of discovery at step 210 by obtaining an identity of the constrained device at step 211, and checking for availability of metadata about multimedia resources controlled by the constrained device in step 212. Steps 211 and 212 may be accomplished by querying a Resource Directory (RD) for identities and multimedia resource metadata of multimedia capable constrained devices in step 212a. Resource Directory is an entity defined in the "CoRE Resource Directory" specification. A Resource Directory hosts descriptions of resources held on CoAP servers, allowing lookups to be performed for these resources. According to examples of the present disclosure, as described in further detail with reference to FIG. 3, constrained devices having multimedia capabilities may register their identity, and metadata about multimedia resources they control, with a Resource Directory. This directory may then be queried by the proxy in step 212a of the method 200 in order to obtain identities and check for multimedia resource metadata of constrained devices.

The CoAP standards define an "Observe" procedure, according to which clients may register as observers for certain resources which may be registered on a Resource Directory. Registered observers receive not only a representation of the requested resource but also notifications of any state change in the resource, the notifications including a complete updated representation of the resource. The process of querying the Resource Directory at step 212a may comprise the proxy registering as an observer for multimedia capable constrained devices, as illustrated at step 212ai.

Other methods of obtaining an identity of constrained device at step 211 may be envisaged, with the identity of constrained devices having multimedia capabilities being made available to the proxy in any convenient manner. Obtaining the identity of the constrained device may thus comprise receiving, requesting, fetching etc. the appropriate identity.

In step 213, the proxy stores any available multimedia resource metadata together with the identity of the constrained device. The proxy then, at step 214, compares available metadata about multimedia resources controlled by the constrained device to parameters required by a multimedia client to establish real time multimedia communication with the constrained device. The proxy may have knowledge of the parameters required by multimedia clients, which knowledge may be programmed into the proxy or may be obtained by the proxy, for example through the initiation of test sessions, through receipt of multimedia content requests or in any other manner.

In step 215, the proxy assesses whether or not the available stored metadata for the constrained device is sufficient to allow a multimedia client to establish a real time multimedia session with the constrained device. If the metadata is insufficient, the proxy establishes the remaining multimedia resource parameters required by a multimedia client via a test session with the constrained device at step 216. This may comprise initiating a test session with the constrained device in step 216a, obtaining the remaining multimedia resource parameters required by a multimedia client during the test session in step 216b, and storing the obtained multimedia resource parameters with the identity of the constrained device in step 216c. Initiating a test session at step 216a may comprise, in step 216ai, requesting multimedia content from the constrained device. Obtaining the remaining multimedia resource parameters in step 216b may comprise seeking to decode the requested multimedia content using different multimedia parameters and determining which parameters enable successful decoding of the content at step 216bi. The multimedia parameters may for example comprise different codecs.

The steps illustrated in FIG. 2b demonstrate how the proxy may ensure that it obtains sufficient information about a multimedia capable constrained device to be able to provide a multimedia client with information required by the client to establish a real time multimedia session with the constrained device. If the constrained device is registered with a Resource Directory, and the identity of the device is accompanied by sufficient metadata about multimedia resource parameters to enable session establishment, then the proxy may simply register as an observer for the constrained device with the Resource Directory and no further action on the part of the proxy may be undertaken in the context of device discovery. If the constrained device is not registered with a Resource Directory and the proxy discovers the identity of the device in some other way, or if the metadata stored in the resource directory is insufficient, then the proxy may establish a test session with the constrained device in order to obtain the remaining resource parameters required by a multimedia client.

Referring again to FIG. 2a, having discovered an identity and a multimedia capability of a constrained device, the proxy then receives, from a multimedia client, a request for multimedia content from the constrained device. The request may for example be a WebRTC request received in the form of a JSEP offer. The multimedia client may obtain an identifier of a multimedia capable constrained device for inclusion in the request via any suitable out-of-band mechanism. The out-of-band mechanism may for example be a web portal where a user can select a sensor with a video camera or microphone to which they request connection. The identifiers may be URIs of the multimedia capable constrained devices controlling the video camera or microphone.

On receipt of the request for multimedia content, the proxy then maps information from the request to a message format used by the constrained device in step 230. As illustrated at step 232 this mapping may be from a JSEP format in which the request was received to a CoAP format used by the constrained device. As illustrated in step 234, the information mapped from the request to the message format used by the constrained device may comprise an indication of a multimedia resource specified in the request and transport layer information for a destination to which the specified resource should be transmitted. As illustrated at step 234, in some examples, the transport layer information may comprise an IP address and a port for the destination to which the specified resource should be transmitted. In further examples, the transport layer information may comprise client side Network Address Translation (NAT) traversal parameters.

In some examples, one or both of the constrained device or multimedia client may be located behind a NAT gateway, and the establishment of a multimedia session between the constrained device and the multimedia client may therefore require NAT traversal. If both constrained device and multimedia client are located behind the same NAT gateway, for example if device and client are a part of the same private network, then NAT traversal may not be necessary. In other cases, client side parameters for a NAT traversal mechanism may be included in the request from the multimedia client.

If the constrained device has the capability to perform a NAT traversal mechanism, then the client side NAT traversal parameters may be mapped by the proxy to the message format used by the constrained device. In some cases, the constrained device may not be equipped with the capability to perform NAT traversal, in which case NAT traversal may be managed between a border router and the multimedia client. In such cases, the client side NAT traversal parameters may be omitted from the information mapped to the constrained device message format (CoAP format), and only the result of the NAT traversal process, in the form of destination address details for the multimedia client, may be forwarded to the constrained device.

In some examples, the information mapped from the request to the CoAP message format may further comprise key material for securing communications between the constrained device and the multimedia client. Any information relating to attributes or parameters not supported by the constrained device may be omitted from the mapping performed by the proxy at step 230.

Once the proxy has mapped information from the request received from the multimedia client, the mapped information is forwarded, in the message format used by the constrained device (for example CoAP) to the constrained device in step 240. The proxy then receives from the constrained device, in step 250, an acknowledgement of the mapped information. The acknowledgement message received from the constrained device may contain different levels of information depending upon the capabilities of the constrained device and whether NAT traversal is required. If the constrained device does not perform NAT traversal, either because NAT traversal is not required or because the constrained device does not have the appropriate capabilities, then the acknowledgement message may be simply an acknowledgement of receipt of the request for multimedia content. The constrained device thus indicates that it has correctly received the request for multimedia content, is ready to send the requested multimedia, and, in the case of NAT traversal, requires only the address details from the border router that will perform NAT traversal. If the constrained device performs NAT traversal itself, then in addition to the above discussed acknowledgement, the acknowledgement message may also contain device side NAT traversal parameters, including for example ICE candidates if the NAT traversal mechanism is Interactive Connectivity Establishment (ICE). Regardless of whether NAT traversal is required or not, the acknowledgement message may also contain device side key material for securing communications between the constrained device and the multimedia client.

The proxy maps information from the acknowledgement to a message format used by the multimedia client in step 260. As illustrated in step 262, this may comprise mapping from a CoAP message format to a JSEP message format. The mapped information may comprise just the acknowledgement or may additionally comprise key material and/or device side NAT traversal mechanism parameters, as illustrated in step 264, if such material/parameters are present in the acknowledgement message received form the device. The proxy then transmits to the multimedia client the mapped information from the acknowledgement and a discovered multimedia capability of the constrained device in step 270. As illustrated in step 272, the proxy may retrieve stored metadata and/or obtained multimedia parameters from step 210 and add these metadata and/or parameters to the mapped information for transmission to the multimedia client. This information may for example include the multimedia codec required to decode the multimedia stream provided by the constrained device. The metadata and/or parameters may include all the information required by the multimedia client to establish a real time multimedia session with the constrained device.

Figure 3:
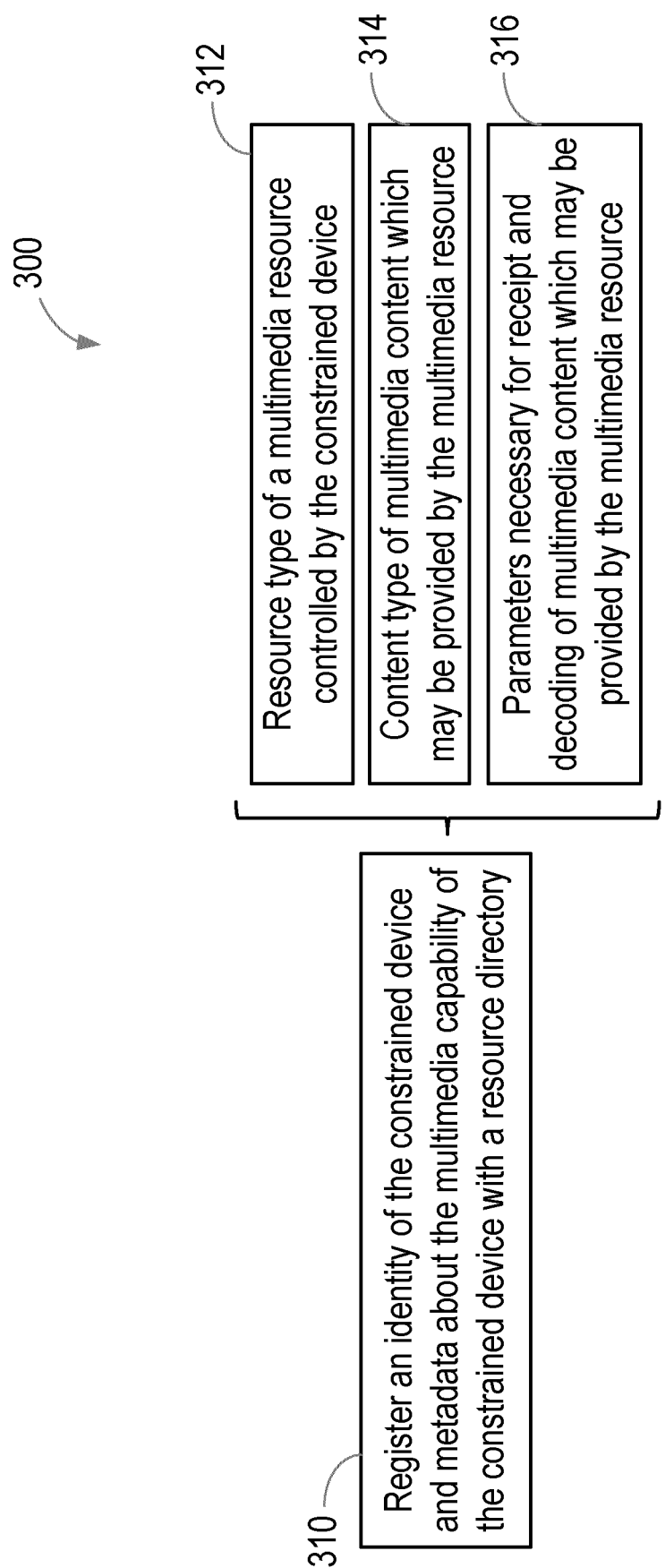
FIG. 3 is a flow chart illustrating process steps in a method performed by a constrained device.

FIG. 3 illustrates an example of a method 300 performed by a constrained device having a multimedia capability. The method 300 comprises the step 310 of registering an identity of the constrained device and metadata about the multimedia capability of the constrained device with a Resource Directory. As discussed above, a Resource Directory is an entity which hosts descriptions of resources held on CoAP servers, allowing lookups to be performed for these resources. As illustrated in steps 312, 314 and 316, the metadata about the multimedia capability may include a resource type of a multimedia resource controlled by the constrained device, a content type of multimedia content which may be provided by the multimedia resource, and/or parameters necessary for the receipt and decoding of multimedia content which may be provided by the multimedia resource. The parameters may for example include codecs, codec parameters, supported RTCP features etc.

According to examples of the present disclosure, when a constrained device registers its multimedia resources with the Resource Directory in step 310, new WebRTC compatible resource types may be used. For example, if a constrained device supports WebRTC audio, it may register its resource with the resource type ("rt") information "multimedia-audio" and in case of WebRTC video, "multimedia-video". The registration may also include information about the URI to connect to the multimedia resources of the constrained device. Content formats of the multimedia resources may also be registered with the Resource Directory. To simplify signalling and discovery, it may be assumed that constrained devices usually have support for only one video and/or audio codec.

The content-type, "ct", attribute is defined in RFC7252 (The Constrained Application Protocol). According to examples of the present disclosure, different content type attribute values may be defined indicating whether the content is audio or video, in addition to a multimedia codec specific part. For example:

H.264 video, "ct" may be "application/video+h.264", ct e.g. 99

PCMU audio codec, "ct" may be "application/audio+pcmu", ct e.g 98

For audio multimedia resources, an "application/audio" "ct" attribute may be used and "application/video" "ct" attribute for video resources. In some cases, the constrained device might not be aware of the codecs the multimedia part of the device is using. In such situations, the ct attribute may be omitted from registration with the Resource Directory and this information may be discovered by the proxy through a test session with the constrained device, as discussed above with reference to FIG. 2a.

Figure 4:
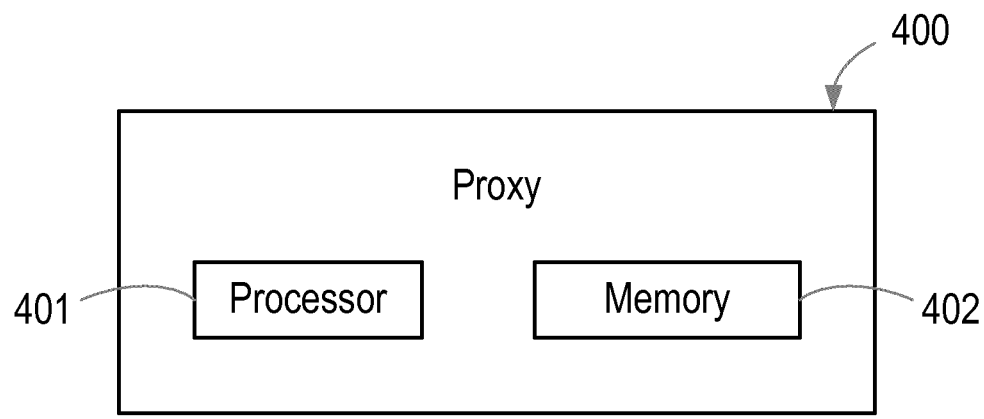
FIG. 4 is a block diagram illustrating functional units in a proxy.

As discussed above, the methods 100, 200 may be performed by a proxy. FIG. 4 illustrates an example proxy 400 which may implement the methods 100, 200, for example on receipt of suitable instructions from a computer program. Referring to FIG. 4, the proxy comprises a processor 401 and a memory 402, the memory 402 contains instructions executable by the processor 401, such that the proxy is operable to carry out some or all of the steps of the method 100 and/or 200.

Figure 5:
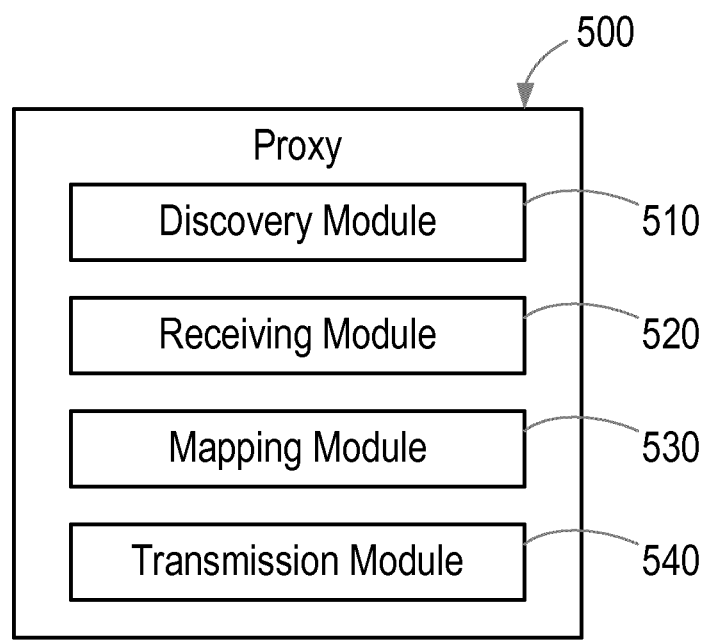
FIG. 5 is a block diagram illustrating functional units in another example of a proxy.

FIG. 5 illustrates another example of a proxy 500 which may implement the methods 100, 200, for example on receipt of suitable instructions from a computer program. It will be appreciated that the modules illustrated in FIG. 5 may be realised in any appropriate combination of hardware and/or software. For example, the modules may comprise one or more processors and one or more memories containing instructions executable by the one or more processors. The modules may be integrated to any degree.

Referring to FIG. 5, the proxy comprises a discovery module 510 for discovering an identity and a multimedia capability of a constrained device and a receiving module 520 for receiving, from a multimedia client, a request for multimedia content from the constrained device. The proxy further comprises a mapping module 530 for mapping information from the request to a message format used by the constrained device and a transmission module 540 for forwarding the mapped information to the constrained device. The receiving module 520 may also be for receiving an acknowledgement of the mapped information from the constrained device, and the mapping module 530 may also be for mapping information from the acknowledgement to a message format used by the multimedia client. The transmitting module may also be for transmitting to the multimedia client the mapped information from the acknowledgement and a discovered multimedia capability of the constrained device.

In some examples of the proxy 500, the discovery module may be for obtaining an identity of the constrained device, checking for availability of metadata about multimedia resources controlled by the constrained device and storing any available metadata with the identity of the device.

Figure 6:
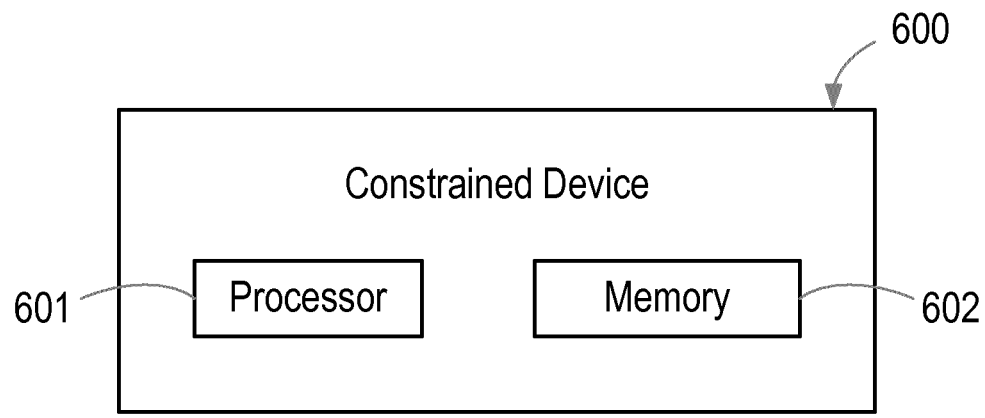
FIG. 6 is a block diagram illustrating functional units in a constrained device.

As discussed above, the method 300 is performed by a constrained device. FIG. 6 illustrates an example constrained device 600 which may implement the method 300, for example on receipt of suitable instructions from a computer program. Referring to FIG. 6, the constrained device comprises a processor 601 and a memory 602, the memory 602 contains instructions executable by the processor 601, such that the constrained device is operable to carry out some or all of the steps of the method 300.

Figure 7:
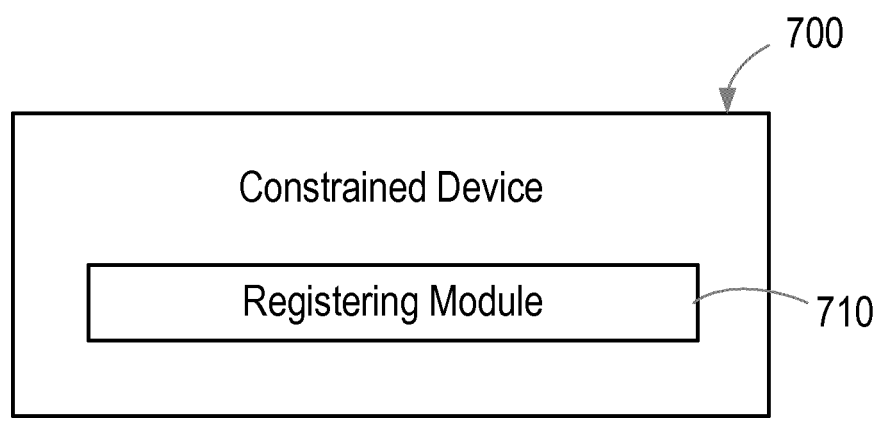
FIG. 7 is a block diagram illustrating functional units in another example of constrained device.

FIG. 7 illustrates another example of constrained device 700 which may implement the method 300, for example on receipt of suitable instructions from a computer program. It will be appreciated that the module illustrated in FIG. 7 may be realised in any appropriate combination of hardware and/or software. For example, the module may comprise one or more processors and one or more memories containing instructions executable by the one or more processors. The module may be integrated to any degree with other modules or units in the device.

Referring to FIG. 7, the constrained device 700 comprises a registering module 710 for registering an identity of the constrained device and metadata about the multimedia capability of the constrained device with a resource directory.

Figure 8:
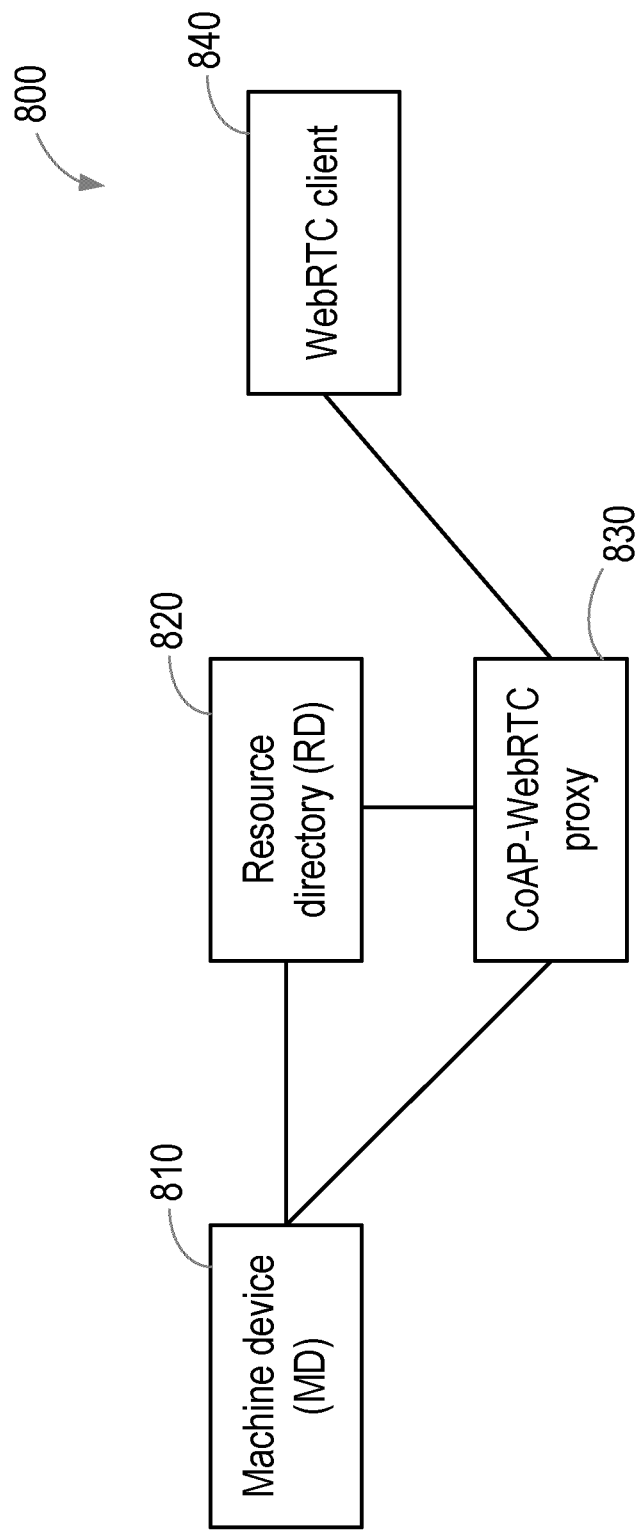
FIG. 8 illustrates an example of a system for facilitating real time multimedia communications.

The constrained device 600, 700, proxy 400, 500 and a multimedia client may together form part of a system, such as the system 800 illustrated in FIG. 8. The system 800 comprises a constrained device, illustrated as Machine Device 810, a proxy 830, and a multimedia client, illustrated as WebRTC client 840. The multimedia client 840 is configured to request multimedia content from the constrained device. The proxy 830 is configured to discover an identity and a multimedia capability of the constrained device 810, receive from the multimedia client 840 the request for multimedia content from the constrained device, map information from the request to a message format used by the constrained device 810, and forward the mapped information to the constrained device 810.

In examples of the system 800, the system further comprises a Resource Directory 820, and the constrained device 810 is configured to register an identity of the constrained device and metadata about the multimedia capability of the constrained device with the Resource Directory 820. The constrained device 810 is also configured to acknowledge to the proxy 830 receipt of the forwarded mapped information, and the proxy 830 is configured to receive the acknowledgement from the constrained device, map information from the acknowledgement to a message format used by the multimedia client 840, and transmit to the multimedia client 840 the mapped information from the acknowledgement and a discovered multimedia capability of the constrained device.

The constrained device 810 and the multimedia client 840 are configured to establish real time multimedia communications on the basis of the information exchanged with and via the proxy 830. Establishing real time multimedia communications may involve the constrained device 810 and the multimedia client 840 performing connectivity checks on the basis of information exchanged with and via the proxy, for example if a NAT traversal mechanism is required and the constrained device 810 has capability to perform NAT traversal.

Figure 9:
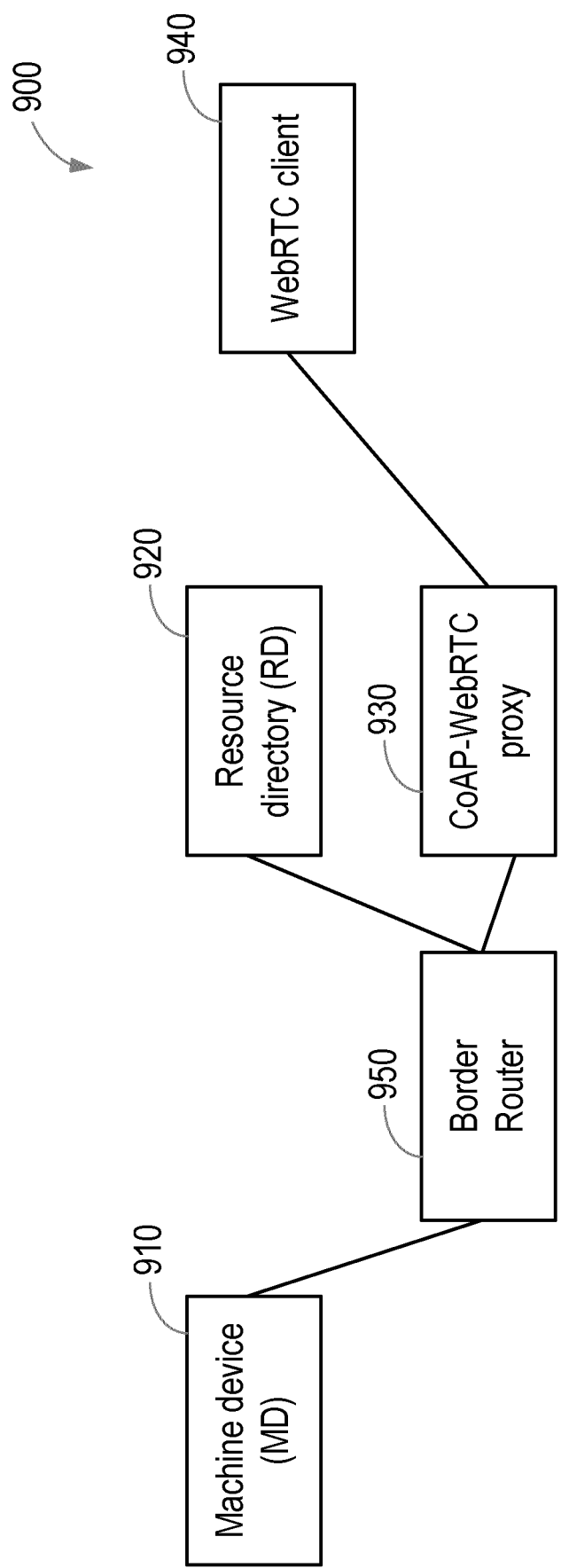
FIG. 9 illustrates another example of a system for facilitating real time multimedia communications.

In some examples, the constrained device 810 may not have NAT traversal capabilities. In such examples, the system 800 may be modified as illustrated in the system 900 of FIG. 9 to include a border router 950. Referring to FIG. 9, the system 900 comprises a constrained device 910, a Resource Directory 920, a proxy 930, a multimedia client 940 and the border router 950. The border router 950 is configured to manage a NAT traversal mechanism for establishing real time multimedia communications between the constrained device 910 and the multimedia client 940.

Figure 10:
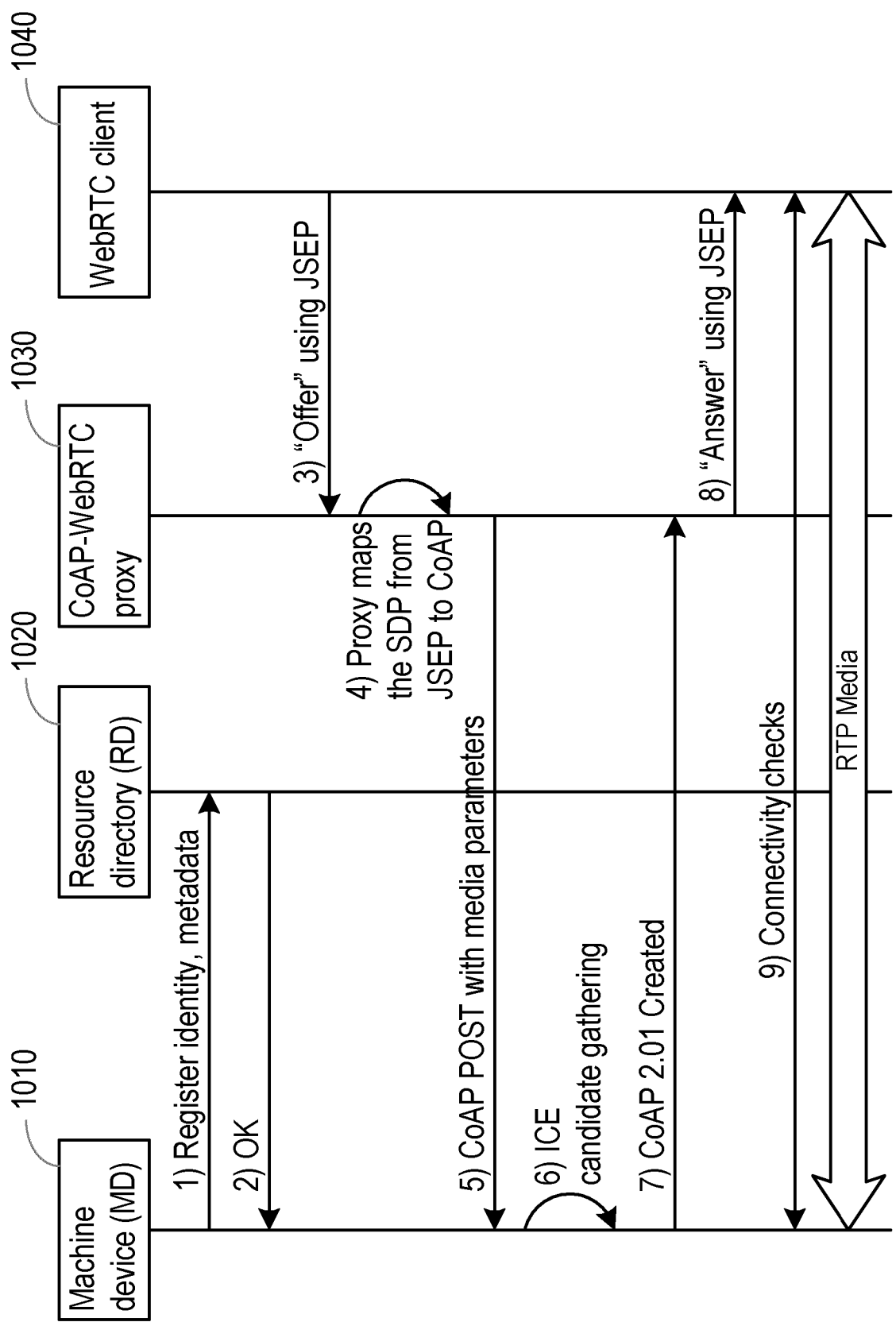
FIG. 10 illustrates message exchange and processing according to example methods performed in a proxy and a constrained device.

FIG. 10 illustrates an example of message flow and processing steps which may be performed by a constrained device (machine device) 1010, a Resource Directory 1020, a proxy 1030 and a multimedia client (WebRTC client) 1040. The message flow and processing steps illustrated in FIG. 10 may take place during the performance by a constrained device and proxy of examples of the methods described above with reference to FIGS. 1 to 3.

Referring to FIG. 10, the constrained device 1010 first registers its identity and metadata with the Resource Directory, this information being transmitted to the resource directory in message 1. An example of a message from the constrained device registering with a Resource Directory could look as follows:

---

Req: POST coap://rd.example.com/rd?ep=node1
Content-Type: application/link-format
Payload
</sensors/video>;ct=99;rt="multimedia-video";if="core.s"
</sensors/audio>;ct=98;rt="multimedia-audio";if="core.s"
</sensors/sensorx>;rt="sensor";if="core.s"

---

In the above example, the identity of the constrained device is node1, however any suitable character string could be used as the constrained device identity, as discussed in further detail above.

If each constrained device is required to register its identity and multimedia capabilities with the Resource Directory, this information is then available to the proxy 1030 via the Resource Directory. Using the CoAP Observe mechanism, the proxy 1030 can become an observer for particular multimedia resource types and receive notifications from the Resource Directory 1020 whenever there are updates to the list of multimedia capable constrained devices.

As discussed above, a further mechanism for the proxy to learn more about the multimedia capabilities of a constrained device is to run a test session between the proxy and the constrained device. By establishing a test multimedia session, the proxy can learn the exact details of the multimedia resources and capabilities (supported codecs for example) of each constrained device. The proxy may store these capabilities and use this information when new multimedia sessions are being established. As discussed above, a test session may be used by the proxy 1030 to complete multimedia resource information when this information is incomplete in the Resource Directory 1020 or when the proxy learns the identity of constrained devices from a source other than the Resource Directory.

If the information from message 1 is successfully registered in the Resource Directory, the Resource Directory acknowledges the registered identity and metadata in message 2.

At some later time, the multimedia client 1040 requests multimedia content from the constrained device 1010. As discussed above, there may be an out-of-band mechanism for the proxy to expose identifiers, including for example URIs, of the multimedia capable constrained devices towards multimedia clients. This could be for example a Web portal where a user can select a sensor with a video camera or microphone from which they wish to receive content.

The request for multimedia content is received at the proxy 1030 in the form of a JSEP WebRTC offer illustrated as message 3.

Assuming a two-way audio session, a sample Session Description Protocol (SDP) in the offer received from the multimedia client 1040 client wishing to receive an audio stream may appear as shown below. This sample flow is based on an example from the Internet Draft "JavaScript Session Establishment Protocol" and corresponds to the payload of message 3. If the multimedia client does not wish to send media itself, the "sendrecv" parameter may be set to "recvonly".

```
v=0
o=- 4962303333179871722 1 IN IP4 0.0.0.0
s=- t=0 0
a=group:BUNDLE a1 v1
a=ice-options:trickle
m=audio 56500 UDP/TLS/RTP/SAVPF 96 0 8 97 98
c=IN IP4 192.0.2.1
a=mid:a1
a=rtcp:56501 IN IP4 192.0.2.1
a=msid:47017fee-b6c1-4162-929c-a25110252400    f83006c5-
a0ff-4e0a-9ed9-d3e6747be7d9
a=sendrecv
a=rtpmap:96 opus/48000/2
a=rtpmap:0 PCMU/8000
a=rtpmap:8 PCMA/8000
a=rtpmap:97 telephone-event/8000
a=rtpmap:98 telephone-event/48000
a=maxptime:120
a=ice-ufrag:ETEn1v9DoTMB9J4r
a=ice-pwd:OtSK0WpNtpUjkY4+86js7ZQl
a=fingerprint:sha-256
19:E2:1C:3B:4B:9F:81:E6:B8:5C:F4:A5:A8:D8:73:04
:BB:05:2F:70:9F:04:A9:0E:05:E9:26:33:E8:70:88:A2
a=setup:actpass
a=rtcp-mux
a=rtcp-rsize
a=extmap:1 urn:ietf:params:rtp-hdrext:ssrc-audio-level
```

-continued

```
a=extmap:2 urn:ietf:params:rtp-hdrext:sdes:mid
a=ssrc:1732846380 cname:EocUG1f0fcg/yvY7
a=candidate:3348148302 1 udp 2113937151 192.0.2.1 56500 typ host
a=candidate:3348148302 2 udp 2113937151 192.0.2.1 56501 typ host
a=end-of-candidates
```

When the request arrives at the proxy 1030, the proxy maps the JSEP offer to a CoAP POST request in step 4. The proxy will map only the minimum set of parameters from the SDP offer to the CoAP POST request for the constrained device 1010. The proxy will ignore from the JSEP request for example RTCP-related attributes if it knows the constrained device doesn't support them. If the request includes resources that are unsupported by the constrained device, on the basis of the metadata registered by the device with the Resource Directory, the proxy can refuse the request for example with a 415 "Unsupported Media Type" response. Assuming the requested resources are supported, and the appropriate information is mapped by the proxy, the resulting CoAP POST may be in a JSON format and is sent towards the constrained device together with the multimedia session description parameters in message 5. The JSON shown below may correspond to the payload of message 5 in FIG. 10.

```
{
m="audio 56500 UDP/TLS/RTP/SAVPF 96 0 8 97 98",
a=["rtcp:56501 IN IP4 192.0.2.1",
"ice-ufrag:ETEn1v9DoTMB9J4r",
"ice-pwd:OtSK0WpNtpUjkY4+86js7ZQl",
"setup:actpass",
"ssrc:1732846380 cname:EocUG1f0fcg/yvY7",
"candidate:3348148302 1 udp 2113937151 192.0.2.1 56500 typ host",
"candidate:3348148302 2 udp 2113937151 192.0.2.1 56501 typ host",
"end-of-candidates"]
}
```

When the constrained device receives the forwarded offer from the proxy it will perform NAT traversal steps if the constrained device has this capability. In the illustrated examples, the NAT traversal mechanism is Interactive Connectivity Establishment (ICE), and the constrained device therefore performs ICE candidate gathering at step 6. The client side ICE candidates were included in the information mapped by the proxy 1030 from the multimedia client offer to the CoAP post. As discussed above, if the constrained device does not support NAT traversal mechanism, then this may be handled by a border router which will manage ICE interaction with the multimedia client and simply forward the result of the ICE process to the constrained device. In such examples, the ICE candidates would not be forwarded to the constrained device and the constrained device would not perform ICE candidate gathering at step 6 but proceed directly to step 7.

At step 7 the constrained device acknowledges the CoAP post received from the proxy. If the constrained device is performing NAT traversal, the acknowledgement will include a "CoAP 2.01 Created" reply towards the proxy as shown in message 7. This reply contains information about the ICE candidates for the constrained device.

An example payload of message 7 from the constrained device could look as shown below. As above, depending on the offer from the multimedia client, the constrained device may be sending media only, and a=sendrecv may instead be a=sendonly.

```
{
m="audio 20000 UDP/TLS/RTP/SAVPF",
a=["ice-ufrag:6sFvz2gdLkEwjZEr",
"ice-pwd:cOTZKZNVlO9RSGsEGM63JXT2",
"ssrc:3429951804 cname:Q/NWs1ao1HmN4Xa5",
"candidate:2299743422 1 udp 2113937151 192.0.2.2 20000 typ host",
"end-of-candidates"]
}
```

When the proxy receives the acknowledgement from the constrained device, it will do appropriate mapping to be able to send the acknowledgement back to the multimedia client in a JSEP/SDP format. A sample payload of the answer from the proxy towards the multimedia client is illustrated below. This SDP corresponds to the payload of the message 8 in FIG. 10. The proxy adds the SDP headers and attributes missing from the answer received from the constrained device. These attributes may be obtained from the Resource Directory 1020 or from a test session that was run before any live multimedia session.

```
v=0
o=- 6729291447651054566 1 IN IP4 0.0.0.0
s=-
t=0 0
a=msid-semantic:WMS
m=audio 20000 UDP/TLS/RTP/SAVPF 96 0 8 97 98
c=IN IP4 192.0.2.2
a=mid:a1
a=rtcp:20000 IN IP4 192.0.2.2
a=msid:PI39StLS8W7ZbQl1sJsWUXkr3Zf12fJUvzQ1
PI39StLS8W7ZbQl1sJsWUXkr3Zf12fJUvzQ1a0
a=sendrecv
a=rtpmap:96 opus/48000/2
a=rtpmap:0 PCMU/8000
a=rtpmap:8 PCMA/8000
a=rtpmap:97 telephone-event/8000
a=rtpmap:98 telephone-event/48000
a=maxptime:120
a=ice-ufrag:6sFvz2gdLkEwjZEr
a=ice-pwd:cOTZKZNVlO9RSGsEGM63JXT2
a=fingerprint:sha-256
 6B:8B:F0:65:5F:78:E2:51:3B:AC:6F:F3:3F:46:1B:35
 :DC:B8:5F:64:1A:24:C2:43:F0:A1:58:D0:A1:2C:19:08
a=setup:active
a=rtcp-mux
a=rtcp-rsize
a=extmap:1 urn:ietf:params:rtp-hdrext:ssrc-audio-level
a=ssrc:3429951804 cname:Q/NWs1ao1HmN4Xa5
a=candidate:2299743422 1 udp 2113937151 192.0.2.2 20000 typ host
a=end-of-candidates
```

In step 9, if NAT traversal is performed by the constrained device, the device and multimedia client perform connectivity checks using the ICE candidates from the offer and answer messages. As soon as a suitable candidate pair is found, the requested media can flow between the two parties. If NAT traversal is handled by a border router then the constrained device 1010 will simply receive the address details of the selected ICE candidate, and will not be involved in the connectivity checks.

A real time multimedia session is then established between the constrained device and the multimedia client.

As discussed briefly above, using the session description parameters, it is possible to specify the media stream to be unidirectional or bidirectional, depending on the use case.

A wide range of use cases for the above discussed methods and apparatus may be envisaged, reflecting the many deployment scenarios for constrained devices having multimedia capabilities, including their application in "smart" technology for residential, industrial, business, utilities and services sectors. One example use case is in manufacturing, according to which a constrained device may control a video camera monitoring some process in a factory environment. Remote access to the video feed controlled by the constrained device may be provided to managers or quality control personnel, enabling remote inspection of the process as required. In such examples, the client and device are likely to be part of the same private, commercial network, and thus may well be located behind the same NAT gateway, meaning NAT traversal may not be required. Another example use case is vehicle technology, according to which an on board camera may be fitted to police vehicles to provide evidence in the case of an incident. Live access to the feed from such cameras may be provided to enable real time monitoring of developing situations. The potentially sensitive nature of such video material means that security measures are very likely to be required, with key material being exchanged between the client and constrained device via the proxy in the mapped messages discussed above. On board vehicle cameras may also be used for performance monitoring of high performance and unmanned vehicles such as military and civilian drones. Access to live feed from video cameras or microphones controlled by constrained devices may enable more effective monitoring and performance management for such vehicles. This access may be facilitated using the methods of the present disclosure.

Examples of the present disclosure thus facilitate real time multimedia communications between a constrained device and a multimedia client by mapping information from a request for multimedia received from a client into a message format used by the constrained device. Information may also be mapped in the opposite direction, from an acknowledgement message received from the constrained device into a message format used by the multimedia client. The mapping may be performed by a proxy which may enable a real time multimedia session to be established by mapping for example between a CoAP message format used by the constrained device and a JSEP message format used by the multimedia client to send and receive WebRTC signalling. The proxy may map only a minimum set of information into the message format for the constrained device, and may add details including multimedia resource information into a message for sending to the multimedia client. The proxy may obtain this information from a Resource Directory, with which constrained devices having multimedia capabilities may register. Constrained devices may register both an identity and metadata about their multimedia resources with the Resource Directory, and the proxy may use the Observe procedure to obtain this information from the Resource Directory. In cases in which the metadata is incomplete with request to the requirements of a multimedia client, or if the proxy obtains constrained device identity from some other source, the proxy may obtain or complete the metadata about constrained device resources by initiating a test session with the constrained device, and determining remaining resource characteristics and parameters by attempting to decode a test stream of multimedia content.

Although the above described examples focus on a two party session, in which media content is sent to a single client, the methods described herein may also be applied to multi party conferencing, with only minor changes in the example signalling discussed above.

Examples of the present disclosure allow CoAP enabled constrained devices to stream multimedia content to a WebRTC enabled client, despite the fact that the current version of the CoAP protocol does not support WebRTC signalling. The constrained devices need not become WebRTC aware, and the multimedia client need not become CoAP aware, as the mapping between CoAP and WebRTC is performed by a proxy, which may ensure that the conversion between different message formats is substantially transparent to both sides. Examples of the present disclosure thus provide WebRTC support for CoAP enabled constrained devices without making any changes to the CoAP protocol and avoiding the need to introduce additional multimedia session protocols for constrained devices.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a proxy for facilitating real time multimedia communications between a constrained device and a multimedia client, the method comprising:
   discovering an identity and a multimedia capability of a constrained device;
   receiving, from a multimedia client, a request for multimedia content from the constrained device, wherein the request is in a message format used by the multimedia client;
   mapping information from a payload of the request to a message format used by the constrained device, wherein the message format used by the constrained device is different than the message format used by the multimedia client; and
   forwarding, to the constrained device, the information as mapped to the message format used by the constrained device.

2. A method as claimed in claim 1, further comprising:
   receiving, from the constrained device, an acknowledgement of the mapped information;
   mapping information from a payload of the acknowledgement to the message format used by the multimedia client; and
   transmitting to the multimedia client the mapped information from the acknowledgement and a discovered multimedia capability of the constrained device.

3. A method as claimed in claim 1, wherein the request is a WebRTC request.

4. A method as claimed in claim 1, wherein the message format used by the constrained device is a Constrained Application Protocol (CoAP) message format.

5. A method as claimed in claim 1, wherein the message format used by the multimedia client is a JavaScript Session Establishment Protocol (JSEP) message format.

6. A method as claimed in claim 1, wherein the information mapped from the payload of the request to the message format used by the constrained device comprises at least:
   an indication of a multimedia resource specified in the request, and
   transport layer information for a destination to which transmission of the specified resource should be initiated.

7. A method as claimed in claim 1, wherein discovering an identity and a multimedia capability of a constrained device comprises:
   obtaining an identity of the constrained device;
   checking for availability of metadata about multimedia resources controlled by the constrained device; and
   storing any available metadata with the identity of the device.

8. The method as claimed in claim 1, wherein the message format used by the multimedia client is a JavaScript Session Establishment Protocol (JSEP) message format, wherein the request is a JSEP offer, wherein the message format used by the constrained device is a Constrained Application Protocol (CoAP) message format, wherein the payload of the request is a Session Description Protocol (SDP) session description, and wherein said forwarding comprises forwarding the information as mapped to the message format used by the constrained device by forwarding the information in a CoAP POST request.

9. A method performed by a constrained device having a multimedia capability, the method comprising:
   registering an identity of the constrained device and metadata about the multimedia capability of the constrained device with a resource directory.

10. A method as claimed in claim 9, wherein the metadata about the multimedia capability of the constrained device comprises at least one of:
    a resource type of a multimedia resource controlled by the constrained device; or
    a content type of multimedia content which may be provided by the multimedia resource.

11. A method as claimed in claim 10, wherein the metadata further comprises:
    parameters necessary for the receipt and decoding of multimedia content which is able to be provided by the multimedia resource.

12. A proxy for facilitating real time multimedia communications between a constrained device and a multimedia client, the proxy comprising:
    a processor and a memory, the memory containing instructions executable by the processor such that the proxy is operative to:
      discover an identity and a multimedia capability of a constrained device;
      receive, from a multimedia client, a request for multimedia content from the constrained device, wherein the request is in a message format used by the multimedia client;
      map information from a payload of the request to a message format used by the constrained device, wherein the message format used by the constrained device is different than the message format used by the multimedia client; and
      forward, to the constrained device, the information as mapped to the message format used by the constrained device.

13. A proxy as claimed in claim 12, wherein the proxy is further operative to:

receive, from the constrained device, an acknowledgement of the mapped information;
map information from a payload of the acknowledgement to the message format used by the multimedia client; and
transmit to the multimedia client the mapped information from the acknowledgement and a discovered multimedia capability of the constrained device.

14. A proxy as claimed in claim 12, wherein the request is a WebRTC request.

15. A proxy as claimed in claim 12, wherein the message format used by the constrained device is a Constrained Application Protocol (CoAP) message format.

16. A proxy as claimed in claim 12, wherein the message format used by the multimedia client is a JavaScript Session Establishment Protocol (JSEP) message format.

17. A proxy as claimed in claim 12, wherein the information mapped from the payload of the request to a message format used by the constrained device comprises at least:
   an indication of a multimedia resource specified in the request, and
   transport layer information for a destination to which transmission of the specified resource should be initiated.

18. A proxy as claimed in claim 12, wherein the proxy is operative to discover the identity and the multimedia capability of the constrained device by:
   obtaining an identity of the constrained device;
   checking for availability of metadata about multimedia resources controlled by the constrained device; and
   storing any available metadata with the identity of the device.

19. A proxy as claimed in claim 12, wherein the message format used by the multimedia client is a JavaScript Session Establishment Protocol (JSEP) message format, and wherein the message format used by the constrained device is a Constrained Application Protocol (CoAP) message format.

20. The proxy as claimed in claim 12, wherein the payload of the request is a Session Description Protocol (SDP) session description.

21. The proxy as claimed in claim 12, wherein the message format used by the multimedia client is a JavaScript Session Establishment Protocol (JSEP) message format, wherein the request is a JSEP offer, wherein the message format used by the constrained device is a Constrained Application Protocol (CoAP) message format, wherein the payload of the request is a Session Description Protocol (SDP) session description, and wherein the proxy is operative to forward the information as mapped to the message format used by the constrained device by forwarding the information in a CoAP POST request.

22. A constrained device configured to have a multimedia capability, the constrained device comprising:
   a processor and a memory, the memory containing instructions executable by the processor such that the constrained device is operative to register an identity of the constrained device and metadata about the multimedia capability of the constrained device with a resource directory.

23. A constrained device as claimed in claim 22, wherein the metadata about the multimedia capability of the constrained device comprises at least one of:
   a resource type of a multimedia resource controlled by the constrained device; or
   a content type of multimedia content which may be provided by the multimedia resource.

24. A constrained device as claimed in claim 23, wherein the metadata further comprises parameters necessary for the receipt and decoding of multimedia content which is able to be provided by the multimedia resource.

\* \* \* \* \*